US008753198B2

(12) United States Patent
Jack (10) Patent No.: US 8,753,198 B2
(45) Date of Patent: Jun. 17, 2014

(54) RESERVATION CONTROLLER, GAMING SYSTEM AND A RESERVATION METHOD (75) Inventor: David Samuel Jack, Northmead (AU)

(73) Assignee: Aristocrat Technologies Australia Pty Limited (AU)

( * ) Notice: Subject to any disclaimer, the term of this patent is extended or adjusted under 35 U.S.C. 154(b) by 1144 days.

(21) Appl. No.: 12/138,296

(22) Filed: Jun. 12, 2008

(65) Prior Publication Data
US 2009/0098935 A1  Apr. 16, 2009

(30) Foreign Application Priority Data

Jun. 14, 2007 (AU) ................................ 2007903197

(51) Int. Cl.
*A63F 9/24* (2006.01)
*G06Q 10/00* (2012.01)
*G07F 17/32* (2006.01)
*G06Q 10/02* (2012.01)

(52) U.S. Cl.
CPC ............ *G07F 17/3227* (2013.01); *G06Q 10/02* (2013.01)
USPC ................... 463/29; 463/24; 463/40; 463/42; 705/5; 705/6

(58) Field of Classification Search
CPC ............ G07F 17/3223; G07F 17/3225; G07F 17/323–17/3239; A63F 2300/5546; A63F 2300/5593; G06Q 10/02; G06Q 10/025
USPC ............................. 463/24, 29, 40, 42; 705/5, 6
See application file for complete search history.

(56) References Cited

U.S. PATENT DOCUMENTS

| 7,607,981 | B2 * | 10/2009 | Walker et al. | 463/20 |
|---|---|---|---|---|
| 7,699,703 | B2 * | 4/2010 | Muir et al. | 463/29 |
| 7,753,789 | B2 * | 7/2010 | Walker et al. | 463/42 |
| 8,221,245 | B2 * | 7/2012 | Walker et al. | 463/43 |
| 8,282,489 | B2 * | 10/2012 | Arezina et al. | 463/42 |
| 8,425,332 | B2 * | 4/2013 | Walker et al. | 463/43 |
| 8,485,906 | B2 * | 7/2013 | Walker et al. | 463/43 |
| 8,500,562 | B2 * | 8/2013 | Walker et al. | 463/43 |
| 8,512,118 | B2 * | 8/2013 | Lui et al. | 463/16 |
| 2006/0189382 | A1 * | 8/2006 | Muir et al. | 463/29 |
| 2006/0264252 | A1 | 11/2006 | White et al. | |
| 2006/0264257 | A1 * | 11/2006 | Jaffe et al. | 463/20 |
| 2007/0032295 | A1 * | 2/2007 | Muir et al. | 463/29 |
| 2008/0076540 | A1 * | 3/2008 | Aida | 463/26 |
| 2009/0117989 | A1 * | 5/2009 | Arezina et al. | 463/20 |

FOREIGN PATENT DOCUMENTS

| AU | 2006236058 | 4/2008 |
|---|---|---|
| JP | 7185100 | 7/1995 |
| JP | 8164261 | 6/1996 |
| JP | 2001-212342 | 8/2001 |
| JP | 2002177587 | 6/2002 |
| JP | 2002306819 | 10/2002 |
| JP | 2002315934 | 10/2002 |
| JP | 2003-199964 | 7/2003 |
| JP | 2005052415 | 3/2005 |
| JP | 2005111010 | 4/2005 |

(Continued)

*Primary Examiner* — Bach Hoang
(74) *Attorney, Agent, or Firm* — McAndrews, Held & Malloy, Ltd.

(57) ABSTRACT

A reservation request is received from a player of a gaming system as to a reservation time, a desired gaming terminal and a desired game. The request is processed, and if acceptable, the reservation is made.

37 Claims, 7 Drawing Sheets

(56) References Cited

FOREIGN PATENT DOCUMENTS

| | | |
|---|---|---|
| JP | 2005111128 | 4/2005 |
| JP | 2005124607 | 5/2005 |
| JP | 2004154514 | 6/2005 |
| JP | 2006289132 | 10/2006 |
| JP | 2006289133 | 10/2006 |
| JP | 2006289134 | 10/2006 |
| JP | 2006289135 | 10/2006 |
| JP | 2006289136 | 10/2006 |
| JP | 2006334248 | 12/2006 |
| JP | 08-294573 | 12/2008 |
| KR | 20020059194 | 7/2002 |
| WO | 2006127801 | 11/2006 |
| WO | 2006137353 | 12/2006 |

* cited by examiner

RESERVATION CONTROLLER, GAMING SYSTEM AND A RESERVATION METHOD

RELATED APPLICATIONS

This application claims priority to Australian Provisional Patent Application No. 2007903197, having a filing date of Jun. 14, 2007, entitled "Reservation Controller, Gaming System and A Reservation Method," which is hereby incorporated by reference herein in its entirety.

FIELD OF THE INVENTION

The present invention relates to a reservation controller, a gaming system with a reservation controller and a reservation method.

BACKGROUND OF THE INVENTION

Currently, some gaming machines are equipped to enable a player to lock a gaming machine, for example, while the player takes a break from the gaming machine. These existing systems use a card such as a magnetic card used in a loyalty system in order for the player to lock the gaming machine. When a player returns to the machine they either enter the PIN of the loyalty or re-enter the swipe card depending on the particular implementation and the gaming machine is unlocked.

It would be desirable to allow gaming machines to be reserved in a wider range of circumstances.

BRIEF SUMMARY OF THE INVENTION

In a first aspect, the invention provides a reservation controller for a gaming system, the reservation controller being arranged to:
  receive a reservation request for a player, the reservation request comprising a reservation time and at least one of a desired terminal and a desired game;
  process the reservation request so as to determine whether the reservation request is acceptable; and
  if the request is acceptable, reserve at least one of a desired terminal and a desired game for the player at the reservation time.

In an embodiment, the reservation controller is further arranged to cause at least one action to take place prior to the reservation time, the action comprising at least one of:
  locking a gaming terminal;
  ending a game session in respect of a game; and
  preventing initiation of a game session in respect of a game.

In an embodiment, the reservation controller is further arranged to determine a terminal affected by a reservation request.

In an embodiment, the reservation controller is arranged to determine an affected terminal based on the desired terminal.

In an embodiment, the reservation controller is arranged to determine an affected terminal based on the desired game being played on the terminal.

In an embodiment, the reservation controller is arranged to cause the affected terminal to display a warning message prior to the reservation time.

In an embodiment, the reservation controller is further arranged to determine whether to award compensation to a player of an affected terminal.

In an embodiment, the reservation controller is further arranged to re-evaluate a reservation prior to taking an action and to modify the reservation if a condition is met.

In an embodiment, the reservation controller re-evaluating the reservation comprises comparing a ranking of the player for whom the reservation was made with a ranking of a player affected by the reservation.

In an embodiment, the reservation controller is modified if the ranking of the player for whom the reservation was made is not superior to the ranking of a player affected by the reservation.

In an embodiment, the reservation controller is modified if the ranking of the player for whom the reservation was made is lower than the a ranking of a player affected by the reservation.

In an embodiment, the reservation controller is further arranged to determine a compensation based on a ranking of a player affected by the reservation.

In an embodiment, the reservation controller is arranged to determine whether a reservation is acceptable at least based on a ranking of a player.

In an embodiment, the reservation controller is further arranged to issue reservation conditions in respect of a reservation.

In an embodiment, the reservation controller further comprises or is associated with a reservation input mechanism operable to enter a reservation request comprising a reservation time and at least one of a desired terminal and a desired game.

In an embodiment, the reservation controller further comprising or being associated with a reservation database for storing reservation data specifying the reservation.

In an embodiment, the reservation controller is comprises a reservation implementer for taking the action.

In an embodiment, the reservation controller is a compensation determiner for determining whether to award compensation.

In an embodiment, the reservation controller is comprises a reservation evaluator for evaluating reservation requests.

In an embodiment, the reservation controller comprises a reservation evaluator for evaluating reservation requests and re-evaluating reservations prior to action being taken.

In an embodiment the reservation controller is arranged to make an alternative reservation in response to the re-evaluation.

In an embodiment, the reservation controller is implemented, at least in part, by a processor executing program code stored in a memory.

In a second aspect, the invention provides a gaming system comprising:
  a plurality of gaming terminals;
  a reservation input mechanism operable to enter a reservation request comprising a reservation time and at least one of a desired terminal and a desired game; and
  a reservation controller in data communication with the plurality of gaming terminals and arranged to process the reservation request to determine whether the reservation request is acceptable and, if the request is acceptable, reserve at least one of a desired terminal and a desired game for the player.

In various embodiments, the gaming system comprises features described above in respect of the game controller.

In an third aspect the invention provides a reservation method comprising:
  receiving a reservation request for a player, the reservation request comprising a reservation time and at least one of a desired terminal and a desired game;
  processing the reservation request so as to determine whether the reservation request is acceptable; and if the request is acceptable, reserving at least one of a desired terminal and a desired game for the player at the reservation time.

In various embodiment, the method implements functions of the reservation controller.

In a fourth aspect of the invention provides computer program code which when executed causes a computer to implement the reservation method.

In a fifth aspect the invention provides computer readable medium having thereon the program code.

In a sixth aspect the invention provides a data signal comprising the program code.

In a sixth aspect the invention provides transmitting or receiving the program code.

DETAILED DESCRIPTION OF THE INVENTION

Referring to the drawings, there is shown a gaming system which has a reservation controller suitable for making reservations. In the embodiments, the reservation controller forms part of a gaming system of a venue such a casino or the like and allows a player to make a reservation for a desired time. Depending on the particular implementation, the reservation may be in respect of a gaming terminal, a game or both a gaming terminal and a game.

While the embodiments describe implementing the reservation controller in respect of a single venue, the technique can readily be extended to plural venues, for example, by making a venue identification part of the reservation request or by retrieving data from a player loyalty system that specifies the venue at which the player plays.

Persons skilled in the art will appreciate that some venues have electronic gaming tables playable by a plurality of players. For the purpose of this specification, a player position at such a table should be understood as being within the meaning of "a gaming terminal". Accordingly, within this specification "gaming terminal" encompasses a single player, electronic gaming machine arranged to play one or more resident games, a player position at a gaming terminal, and an interactive video gaming terminal in a server based gaming system.

Figure 1:
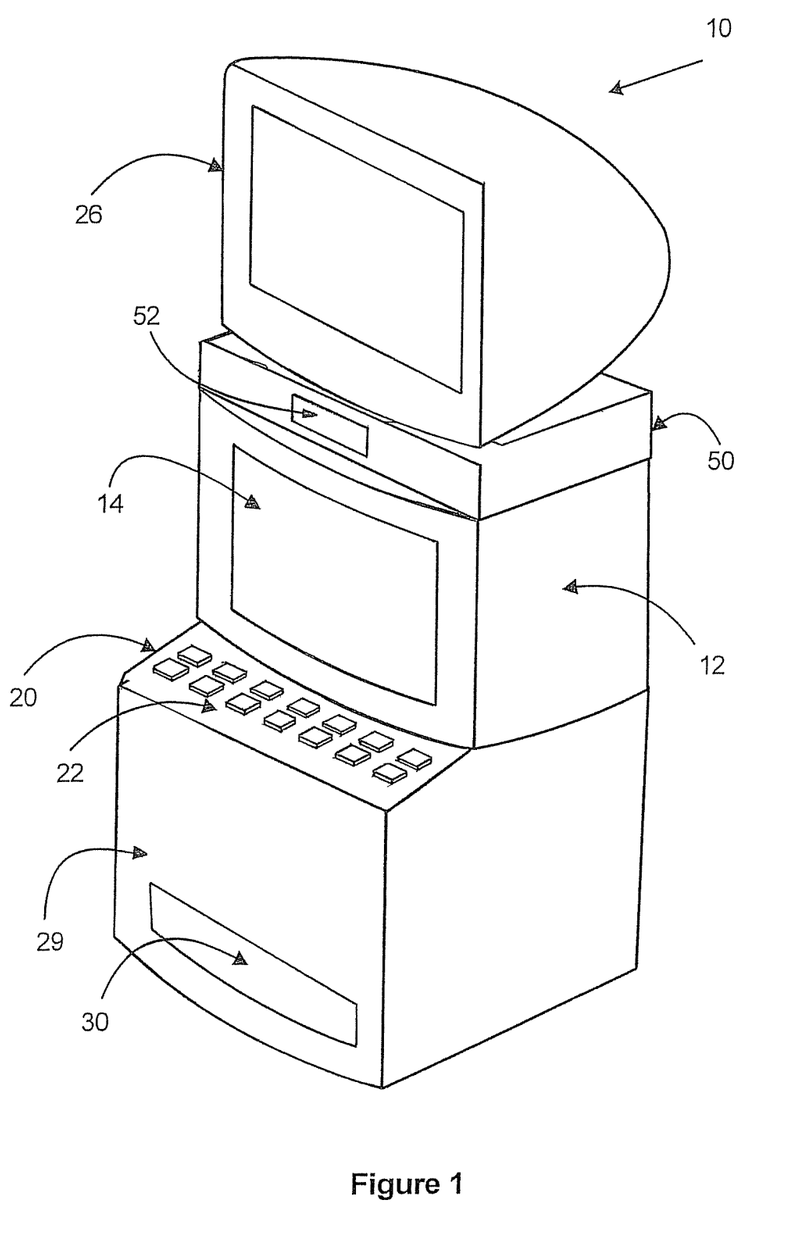
FIG. 1 is a perspective view of a gaming machine of the embodiment.

A typical stand alone gaming machine 10 is illustrated in FIG. 1. The gaming machine 10 includes a console 12 having a display 14 on which is displayed representations of a game that can be played by a player. A mid-trim 20 of the gaming machine 10 houses a bank of buttons 22 for enabling a player to interact with the gaming machine, in particular during game play. The mid-trim 20 also houses a credit input mechanism for example a coin input chute and/or a bill collector 24B. Other credit input mechanisms may also be employed, for example, a card reader for reading a smart card, debit card or credit card.

Artwork and/or information, for example pay tables and details of bonus awards and other information or images relating to the game may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 also includes a display which may be of the same type as the display 14, or of a different type.

A player marketing module (PMM) 50 having a display 52 is connected to the gaming machine 10. The main purpose of the PMM 50 is to allow the player to interact with a player loyalty system. The PMM has a magnetic card reader for the purpose of reading a player tracking device in the form of a magnetic swipe card, for example as part of a loyalty program. However other reading devices may be employed and the player tracking device may be in the form of a card, flash drive or any other portable storage medium capable of being read by a reading device.

Figure 2:
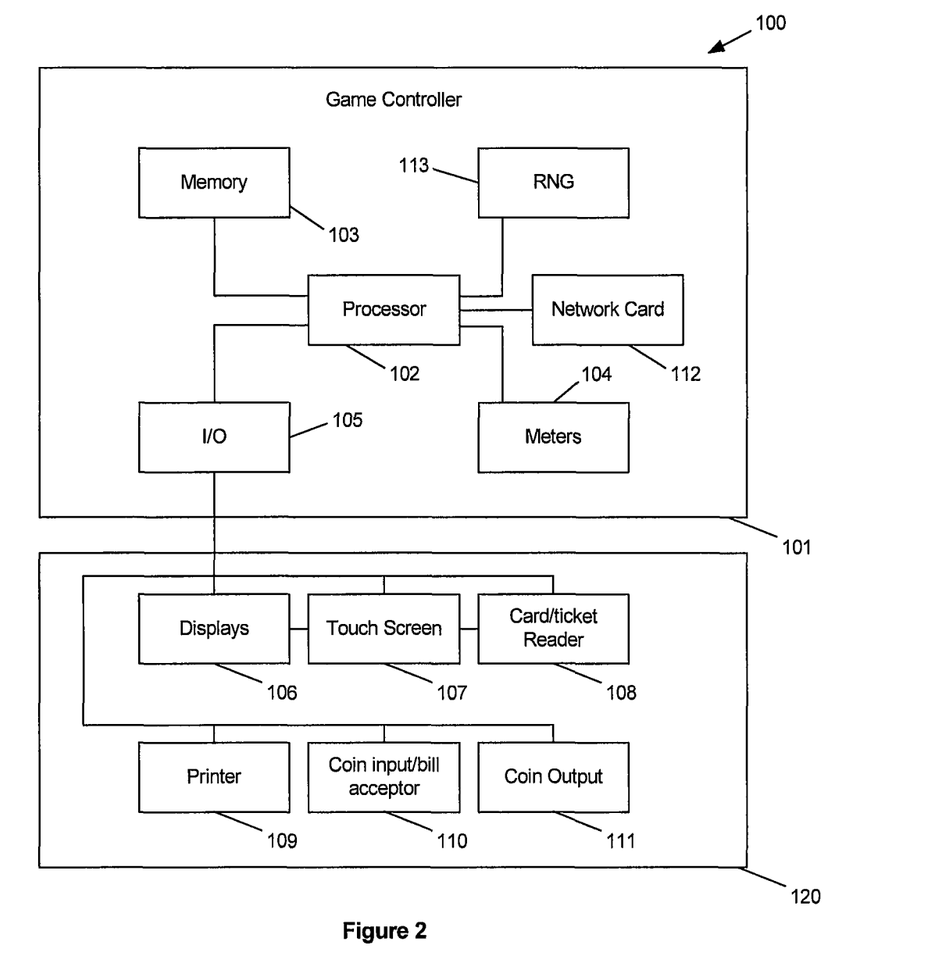
FIG. 2 is a block diagram of a gaming machine of the embodiment.

FIG. 2 shows a block diagram of operative components of a typical gaming machine which may be the same as or different to the gaming machine of FIG. 1.

The gaming machine 100 includes a game controller 101 having a processor 102. Instructions and data to control operation of the processor 102 are stored in a memory 103, which is in data communication with the processor 102. Herein the term "processor" is used to refer generically to any device that can process game play instructions in accordance with game play rules and may include: a microprocessor, microcontroller, programmable logic device or other computational device, a general purpose computer (e.g. a PC) or a server.

Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 has one or more displays 106, a touch screen 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

Figure 3:
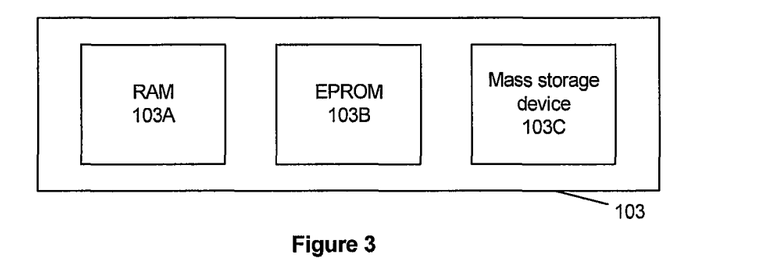
FIG. 3 is a block diagram of the memory of a gaming machine.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 4:
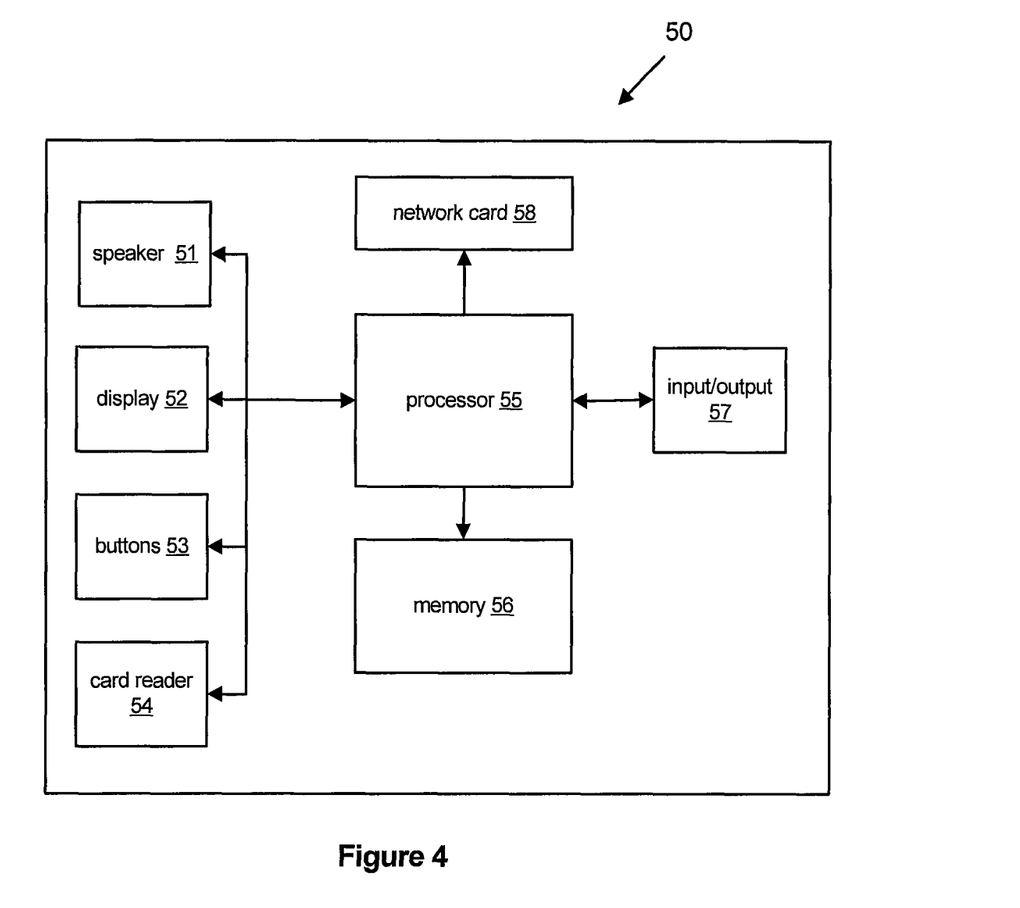
FIG. 4 is a block diagram of a player marketing module of the gaming system of the embodiment.

FIG. 4 is a block diagram of a player marketing module 50. The player marketing module 50 is connected via input/output port 57 to a serial input output port of the input/output section 105 of the electronic gaming machine. The player marketing module has a card reader 54 and a display 52 which may be a touch screen display. The PMM 50 may also have buttons 53 for receiving a player input (at least in embodiments where there is no touch screen display) and a speaker 51. Input received from the card reader 54 is processed by processor 55 based on the data stored in memory 56. The PMM 50 is connected to the loyalty system by a network card 58. Thus, in the embodiment, the gaming machine 10 communicates with the loyalty system via the PMM as described in further detail below. Processor 55 is also arranged to communicate with a gaming machine 10 via input output port 54 to cause locking of the gaming machine in response to an instruction received via the network card 58.

Processor 55 is also arranged to communicate with gaming machine 10 via input output port 57 to cause locking of the gaming machine in response to an instruction received via the network card 58.

Figure 5:
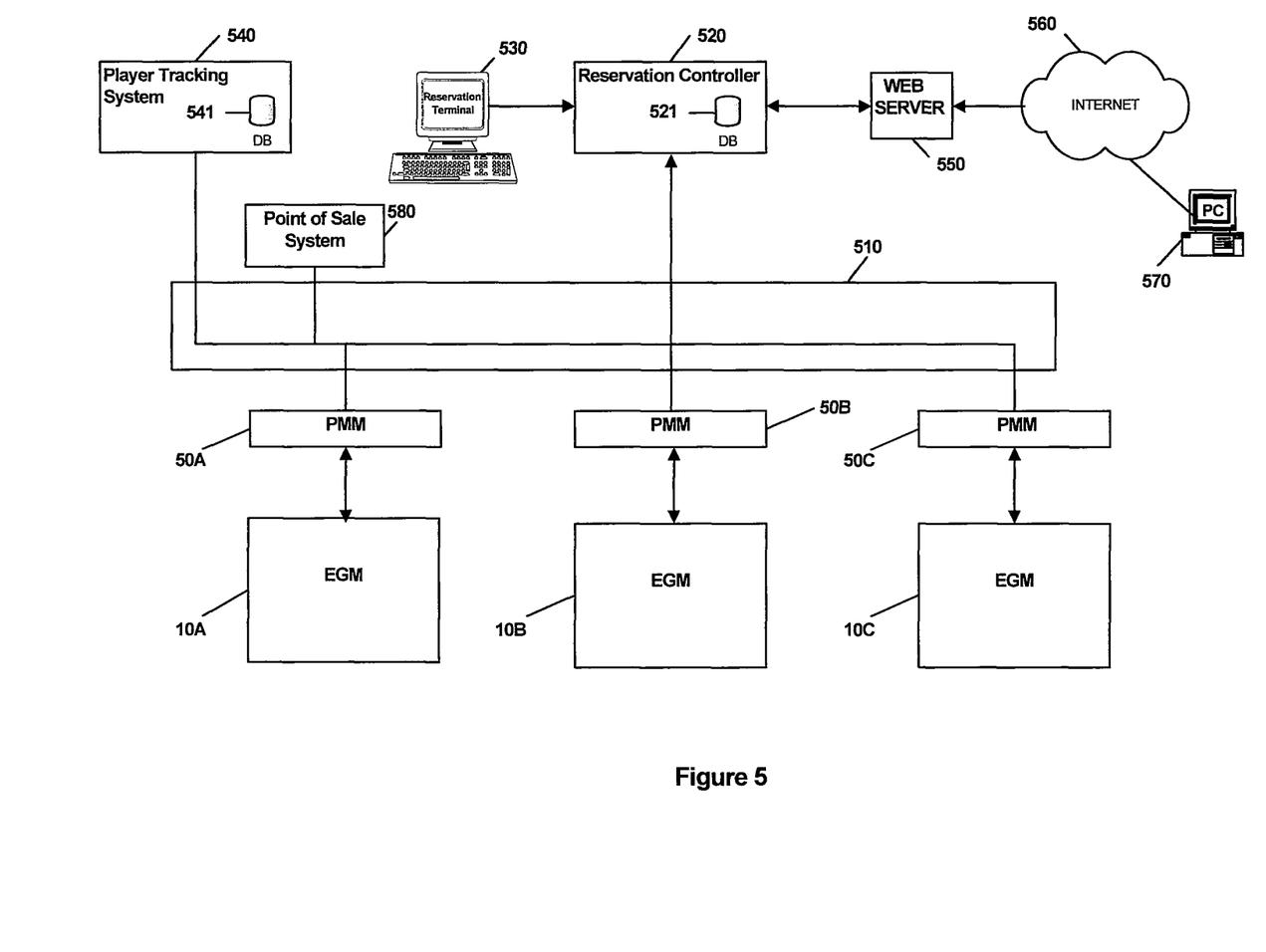
FIG. 5 is a block diagram showing how a plurality of gaming machines are networked and in data communication with a reservation controller.

FIG. 5 shows a series of electronic gaming machines 10 connected via respective player marketing modules 50 over a communications network 510 to a reservation controller 520 and a player tracking system 540. The communications network 510 may be any suitable communications network for example an Ethernet. The reservation controller 520 has a reservation database 521 in which it stores reservations. FIG. 5 illustrates two manners in which the reservation controller 520 may be operated to make a reservation in the reservation database 521. Firstly, the venue operator may employ a reservation terminal 530 in order to manually enter a reservation using the reservation controller 520. For example, in response to receiving a phone call requesting a reservation.

In a second manner, a user operates their PC 570 to connect over the internet 560 to a web server 550 which provides access to the reservation controller 520. The player is served a form from web server 550 over the internet to their PC which once completed results in the submission of a reservation request.

Persons skilled in the art will appreciate that players may access a web server in other manners, for example using portable mobile devices. Further, alternative techniques such as SMS bookings may be implemented. In other embodiments reservations may be made via the interface of a PMM.

Depending on the embodiment, the user of the reservation controller will implement different reservation parameters for gaming system as required parameters for a reservation request. One reservation parameter will typically be a reservation time—i.e. the parameter identify the time and date when the reservation is to be made. Another reservation parameter will typically be at least one of a gaming terminal and a game. In a traditional gaming venue where games are resident on gaming machines, a player may be able to completely represent a reservation by identifying a gaming machine which thus implicitly reserves the game that is available on that gaming machine. Similarly, a player may simply want to reserve a game and there may be several gaming machines that have that game available on it and hence simply reserving the game may be sufficient. However, a player may even if there are plural versions of a game, a player may wish to reserve a particular gaming machine at which the player likes to sit.

In a server based game environment, there may be additional complications. As above, the player may wish to reserve a particular terminal, however in a downloadable environment, there may be limited licences for a particular game for play at the venue (or even across a number of venues). Accordingly, in a downloadable environment, a player's reservation may in effect reserve a licence to that game for the reservation time. As in prior art systems, a reservation may have limited of say half an hour after which the reservation is lifted.

Figure 6:
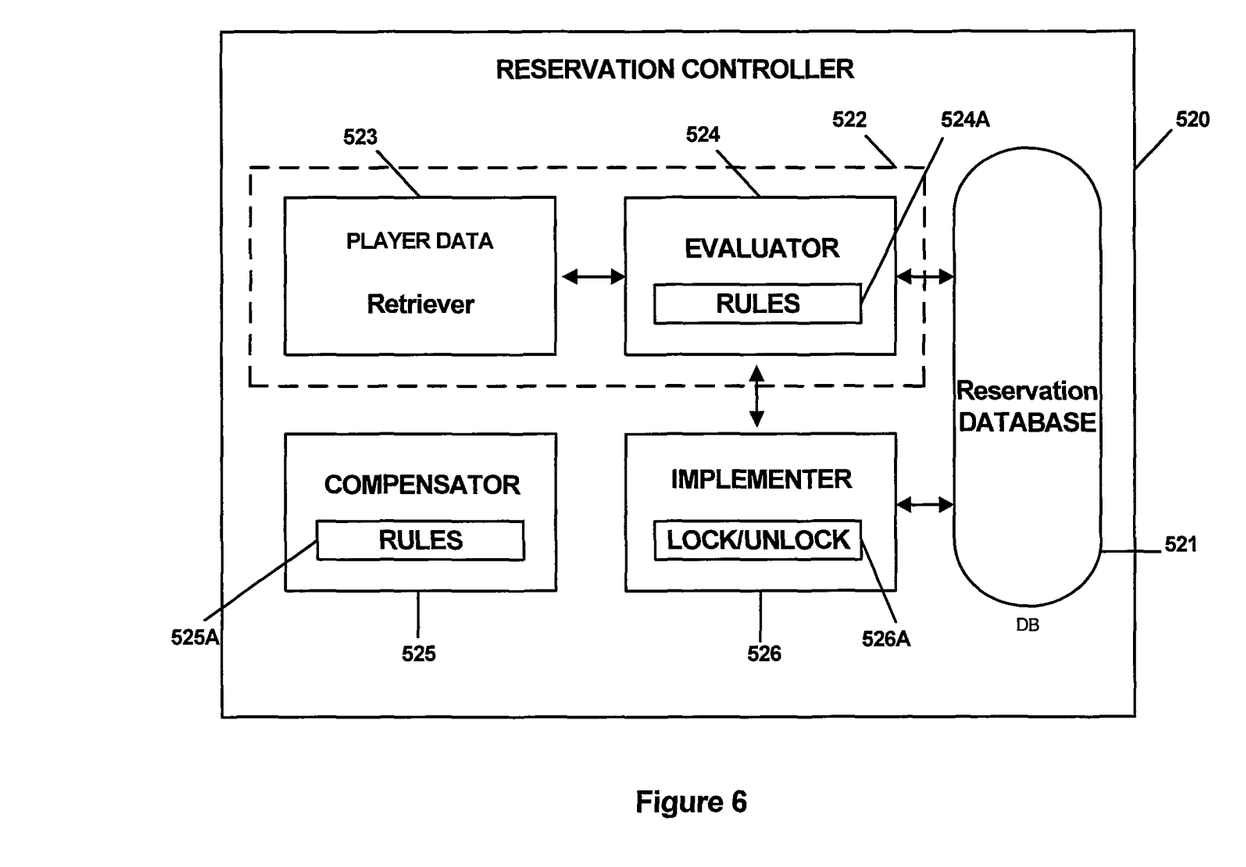
FIG. 6 is a functional block diagram of a reservation controller.

A functional block diagram of a reservation controller is shown in FIG. 6 which illustrates a typically operation of the reservation controller. Reservation controller 520 includes a reservation processor module 522 which receives an input as described in relation to FIG. 5. The input typically includes a reservation request as well as data that identifies the player. The player data retriever 523 retrieves data about the player from the player tracking system 540, specifically from player tracking database 541. This retrieved data is processed in conjunction with the reservation request by the evaluator 524 based on the evaluation rules 524A. The evaluation rules 524A will vary from venue to venue. In some embodiments, all players who are members of a tracking systems may be allowed to make a reservation irrespective their status or ranking as determined by the player loyalty system. In other embodiments, the rules 524A may limit players who have access to the reservation system to those who have a particular status. The rules 524A may also specify how clashes between reservations resolve. In one example, the rules 524A may specify that reservations work in a first in first served manner. In other embodiments, reservations may be evaluated on the basis of player rankings such that higher ranking players are given preference. This may also be used in re-evaluations described in further detail below. If a reservation is accepted by the reservation evaluator 524, details are entered in the reservation database.

The reservation implementer 526 processes the reservations in the database based on timing information. Typically the implementer 536 initially issues a warning by transmitting a warning signal via PMM 50 to gaming terminal 10 at sometime prior to the reservation time. In an embodiment, an initial warning machine message is issued to a gaming machine indicating that the machine has been reserved at a particular time so that a player is given advance warning that a gaming machine will be locked. A further warning is issued at a predetermined time prior to the machine being locked. Subsequently lock/unlock function 526A issues a lock command to the PMM of the affected gaming machine 10 and the PMM 50 to lock the gaming machine. A gaming machine 10 is then locked until a player enters an identification, typically by swiping a player tracking card into the PMM 50 and entering the associated PIN. To check the identification the unlock function 526A may either obtain an identification data corresponding to the player tracking device from the player tracking system and validating the data or send the identification data obtained from the PMM to the player tracking system for validation. If the data is valid, the EGM 10 is unlocked.

The embodiment also provides a compensation function where compensator 525 determines whether to award compensation to a player affected by the locking of a machine compensation. Typically compensation will be determined based on rules including a player status. Compensation may take the form of loyalty points, cash, reservation sessions, goods and/or services. For example, the reservation controller may communicate with a point of sale system 580 for the redemption of goods and services—eg. the venue may offer a free lunch that can be redeemed from the point of sale system 580 within a time period corresponding to the reservation, say 20 minutes each side of the reservation time.

In the embodiment, the implementer is arranged prior to initiating a lock 526A, to provided data identifying the player currently playing the gaming machine to the evaluator 524 to re-evaluate whether the reservation should be implemented. This is to allow for a situation where a higher ranked player has begun playing a gaming machine after the reservation was made. The evaluator 524 can determine whether either to invoke the compensator 525 to offer a higher compensation that would normally be offered, or to modify the reservation. For example, by offering the reserving player an alternative machine (that is making an alternative reservation) or compensation based on the clash. Players may be warned in advance as to what circumstances can result in rejection or modification of reservations.

In other embodiments, alternative reservations may be made in response to the initial reservation request, for example an offer of a best available match to the requested reservation. Further, a reservation may be made as part of compensation for the player displaced by the reservation.

Figure 7:
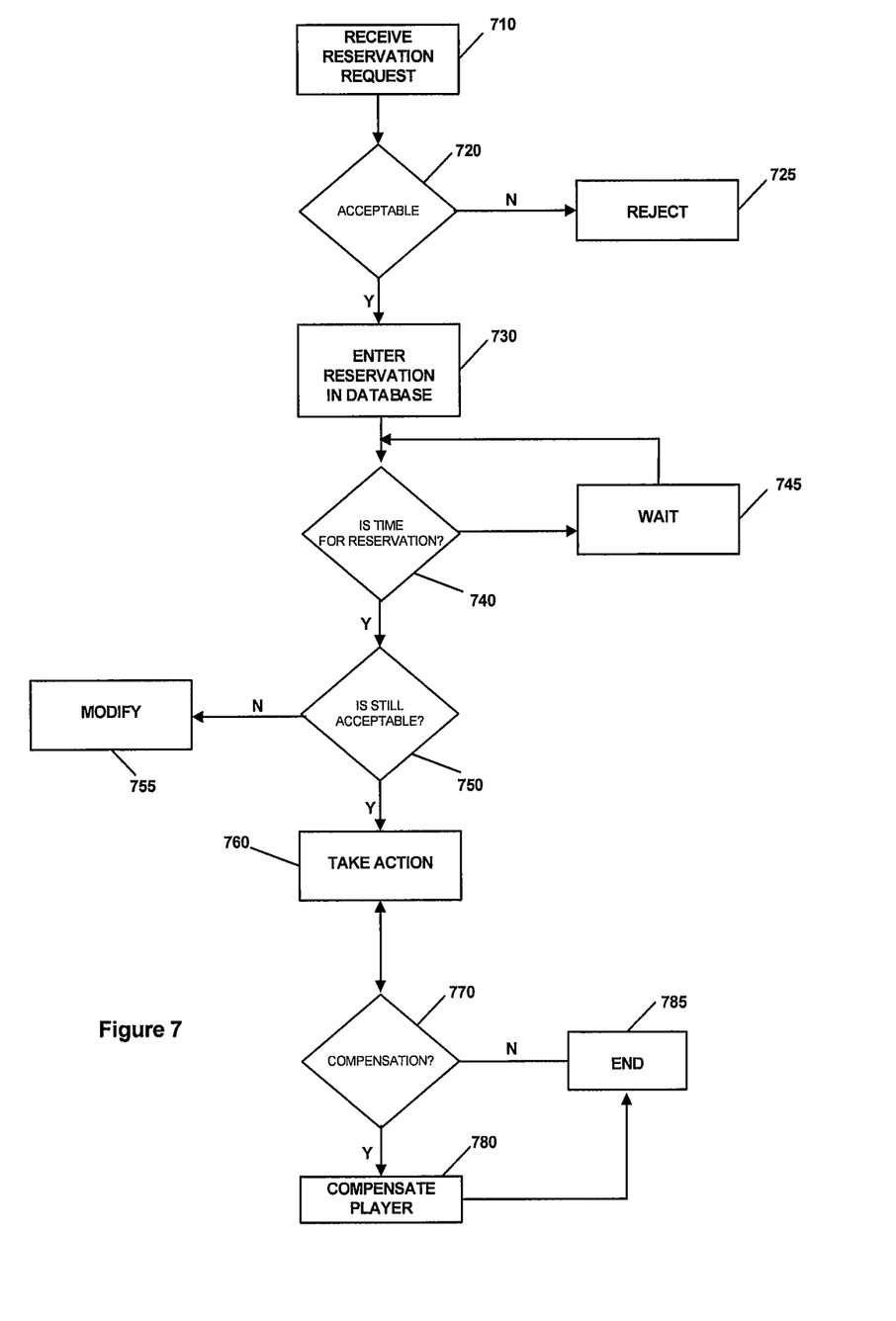
FIG. 7 is a flowchart of a gaming method of the embodiment.

Accordingly, the invention provides a method 700 where a reservation request is received 710 and is determined 720 whether it is acceptable. If it is not acceptable it is rejected 725. If it is acceptable it is entered 730 into the reservation database. The implementer determines whether it is time for the reservation 740 and enters a wait state 745 until it is time for a particular reservation.

The method also involves determining 750 whether the reservation is still acceptable. If it is not acceptable it is modified 755. If it is acceptable an action is taken 760 in order to implement the reservation and it is determined 770 whether compensation should be offered. If a player may then be compensated 780 and the process end 785.

Figure 8:
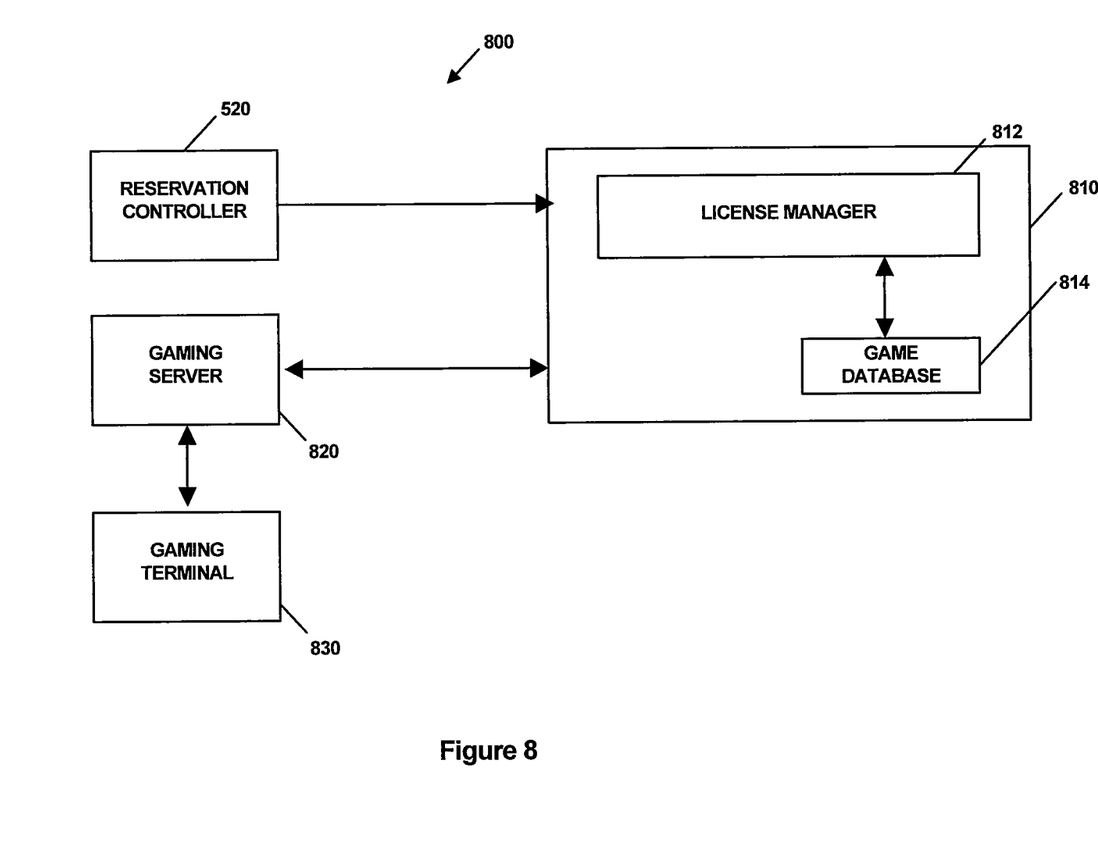
FIG. 8 is a functional block diagram showing an example of operation of a reservation controller in a server based gaming environment.

FIG. 8 illustrates in a functional block diagram how a reservation controller may be implemented in a networked gaming environment 800. In the networked gaming environment a gaming terminal 830 seeks to establish a game session with a gaming server 820. A gaming server access a central database 810 which includes a database of games 814 and a licensed manager 812.

In order to implement a reservation, the reservation controller ensures that a licence is available when the player access the gaming terminal. In this embodiment the reservation controller 520 communicates with the licence manager 812 at a time prior to the reservation time to advise that a licence is required. The licence manager 812 determines whether there are any licences available. If a licence is available the licence manager reserves a licence to prevent it being accessed by a person other than the player who has made the reservation. If all licences for a particular game are in use, the licence manager extracts data from the game database 814 which specifies which gaming sessions are active. The reservation controller 520 processes this information to determine a session to end. For example, it may choose to end the session of a player who is not a member of the player loyalty program or to end the session with the lowest ranked player who is a member of the loyalty program. Compensation may be provided in the same manner as described above.

Various modifications will be apparent to a persons skilled in the art and will be understood as falling within the scope of the invention described herein. For example, while in the embodiment of FIG. 5, the gaming machines communicate with the player loyalty system via the player marketing modules, the gaming machines could themselves incorporate a locking mechanism and could communicate directly with the reservation controller. Further persons skilled in the art will appreciate that various features described above can be combined to form further embodiments.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that the reference to prior art herein does not constitute an admission that the prior art forms a part of the common general knowledge in the art any country.

The invention claimed is:

1. An electronic reservation controller for a gaming system having a plurality of gaming terminals each configured for play of at least one game by a first player during at least one of a plurality of game sessions, and for use with a reservation terminal remotely located from the reservation controller and connected to the reservation controller via a communications network, the reservation controller comprising:

a reservation processor configured to receive a reservation request via the reservation terminal, the reservation request comprising at least two reservation parameters, a first reservation parameter representative of a reservation time starting in the future and a second reservation parameter representative of a game;

an evaluator configured to process the reservation request so as to determine whether the reservation request is acceptable;

an implementer configured to select, if the reservation request is acceptable, one gaming terminal of the plurality of gaming terminals for play of the game represented by the second reservation parameter, and reserve that selected said one gaming terminal for the first player at the time starting in the future represented by the first reservation parameter, and wherein the implementer is configured to determine whether a second player of said one gaming terminal is affected by the reservation request; and a compensator configured to determine whether to award compensation to the second player.

2. An electronic reservation controller as claimed in claim 1, and wherein the implementer is further configured to cause at least one action to take place prior to the reservation time, the action comprising at least one of:
   locking the selected said one gaming terminal;
   ending at least one of a plurality of game sessions at the selected said one gaming terminal; and
   preventing initiation of at least one of a plurality of game sessions in respect of the game.

3. An electronic reservation controller as claimed in claim 1, wherein the implementer is configured to determine the one gaming terminal to be selected based on the game represented by the second reservation parameter.

4. An electronic reservation controller as claimed in claim 1, and wherein the implementer is configured to determine the one gaming terminal to be selected based on a game being played on the one gaming terminal.

5. An electronic reservation controller as claimed in claim 1, and wherein the implementer is configured to cause the selected said one gaming terminal to display a warning message prior to the reservation time.

6. An electronic reservation controller as claimed in claim 1, and wherein the evaluator is configured to re-evaluate the reservation request prior to the reservation time and to modify the reservation request if a condition is met.

7. An electronic reservation controller as claimed in claim 6, wherein the evaluator is configured to re-evaluate the reservation request by comparing a ranking of the first player for whom the reservation request was made with a ranking of the second player affected by the reservation request.

8. An electronic reservation controller as claimed in claim 7, wherein the reservation request is modified if the ranking of the first player for whom the reservation request was made is not superior to the ranking of the second player affected by the reservation request.

9. An electronic reservation controller as claimed in claim 7, wherein the reservation request is modified if the ranking of the first player for whom the reservation request was made is lower than the ranking of the second player affected by the reservation request.

10. An electronic reservation controller as claimed in claim 1, and wherein the compensator is further configured to determine the compensation based on a ranking of the second player affected by the reservation request.

11. An electronic reservation controller as claimed in claim 1, and wherein the evaluator is further configured to determine whether the reservation request is acceptable at least based on a ranking of a the first player.

12. An electronic reservation controller as claimed in claim 1, and wherein the implementer is further configured to issue reservation conditions in respect of the reservation request.

13. An electronic reservation controller as claimed in claim 1, and wherein the reservation processor further comprises a reservation input mechanism operable to enter the reservation request.

14. An electronic reservation controller as claimed in claim 1, and wherein the reservation processor further comprises a reservation database for storing reservation data specifying the reservation request.

15. A gaming system for play of at least one game by a first player during at least one of a plurality of game sessions, comprising:
   a plurality of gaming machines each configured for play of the at least one game;
   a remote reservation terminal;
   a communications network;
   a reservation input mechanism connected to said remote reservation terminal via said communications network, said reservation input mechanism operable to enter a reservation request comprising at least two reservation parameters, a first reservation parameter representative of a reservation time starting in the future and a second reservation parameter representative of a game; and
   a reservation controller in data communication with the plurality of gaming machines and configured to process the reservation request to determine whether the reservation request is acceptable and, if the request is acceptable, select one gaming machine of the plurality of gaming machines for play of the game represented by the second reservation parameter, and reserve that selected gaming machine for the first player at the reservation time starting in the future represented by the first reservation parameter, and wherein the reservation controller is configured to determine whether a second player of said one gaming machine is affected by the reservation request and to determine whether to award compensation to the second player of said one gaming machine.

16. A gaming system as claimed in claim 15, wherein said reservation controller is configured to take at least one action prior to the reservation time, the action comprising at least one of:
   locking the selected said one gaming machine;
   ending at least one of a plurality of game sessions at the selected said one gaming machine; and
   preventing initiation of at least one of a plurality of game sessions in respect of the game.

17. A gaming system as claimed in claim 15, wherein the reservation controller is configured to determine the gaming machine to be selected based on the game represented by the second reservation parameter.

18. A gaming system as claimed in claim 15 wherein the reservation controller is configured to determine the gaming machine to be selected based on a game being played on the gaming machine.

19. A gaming system as claimed in claim 15 wherein the reservation controller is configured to cause the selected gaming machine to display a warning message prior to the reservation time.

20. A gaming system as claimed in claim 15, wherein the reservation controller is configured to re-evaluate the reservation request prior to the reservation time and to modify the reservation request if a condition is met.

21. A gaming system as claimed in claim 15, wherein the reservation controller is arranged to determine the compensation based on a ranking of the second player affected by the reservation request.

22. A gaming system as claimed as claimed in claim 15, wherein the reservation controller is arranged to determine whether a reservation is acceptable at least based on a ranking of the first player.

23. A gaming system as claimed in claim 16, and wherein the reservation controller is arranged to issue reservation conditions in respect of the reservation request.

24. A gaming system as claimed as claimed in claim 15, and further comprising a reservation database for storing reservation data specifying the reservation request.

25. A reservation method for use with a gaming system having a gaming controller and a plurality of gaming machines each configured for play of at least one game by a first player during at least one of a plurality of game sessions, and for use with a remote reservation terminal via a communications network, the method comprising:

receiving a reservation request for the first player from the remote reservation terminal via the communications network, the reservation request comprising at least two reservation parameters, a first reservation parameter representative of a reservation time starting in the future and a second reservation parameter representative of a game;

processing the reservation request, via a computer processor, so as to determine whether the reservation request is acceptable; and selecting, if the reservation request is acceptable, one gaming machine of the plurality of gaming machines for play of the game represented by the second reservation parameter and reserving that selected said one gaming machine for the first player at said reservation time starting in the future represented by the first reservation parameter;

determining whether a second player of said one gaming machine is affected by the reservation request; and determining whether to award compensation to the second player.

26. A reservation method as claimed in claim 25, comprising taking at least one action prior to the reservation time, the action comprising at least one of:

locking the selected said one gaming machine;

ending at least one of a plurality of game sessions at the selected said one gaming machine; and preventing initiation of at least one of a plurality of game sessions in respect of the game.

27. A reservation method as claimed in claim 25, comprising determining the affected gaming machine based on the game represented by the second reservation parameter.

28. A reservation method as claimed in claim 25, comprising determining said one gaming machine based on the game being played on said one gaming machine.

29. A reservation method as claimed in claims 25, comprising causing said one gaming machine to display a warning message prior to the reservation time.

30. A reservation method as claimed in claim 25 and further comprising re-evaluating the reservation request prior to the reservation time and modifying the reservation request if a condition is met.

31. A reservation method as claimed in claim 30, wherein said re-evaluating the reservation request comprises comparing a ranking of the first player for whom the reservation request was made with a ranking of the second player affected by the reservation request.

32. A reservation method as claimed in claim 31, wherein said modifying the reservation request includes modifying the reservation request if the ranking of the first player for whom the reservation request was made is not superior to the ranking of the second player affected by the reservation request.

33. A reservation method as claimed in claim 31, wherein said modifying the reservation request includes modifying the reservation request if the ranking of the first player for whom the reservation request was made is lower than the ranking of the second player affected by the reservation request.

34. A reservation method as claimed in claim 25, comprising determining the compensation based on a ranking of the second player affected by the reservation request.

35. A reservation method as claimed in claim 25, and comprising determining whether the reservation request is acceptable at least based on a ranking of the first player.

36. A reservation method as claimed in claim 25, and further comprising issuing reservation conditions in respect of the reservation request.

37. A reservation method as claimed in claim 30, and wherein said modifying the reservation request includes making an alternative reservation request.

* * * * *